(12) United States Patent
Seshadri

(10) Patent No.: US 10,725,899 B2
(45) Date of Patent: Jul. 28, 2020

(54) METHOD AND SYSTEM OF PERFORMING AUTOMATED EXPLORATORY TESTING OF SOFTWARE APPLICATIONS

(71) Applicant: WIPRO LIMITED, Bangalore (IN)

(72) Inventor: Vinod Seshadri, Coimbatore (IN)

(73) Assignee: Wipro Limited, Bangalore (IN)

(*) Notice: Subject to any disclaimer, the term of this patent is extended or adjusted under 35 U.S.C. 154(b) by 27 days.

(21) Appl. No.: 16/111,251

(22) Filed: Aug. 24, 2018

(65) Prior Publication Data

US 2020/0004667 A1    Jan. 2, 2020

(51) Int. Cl.
G06F 11/36    (2006.01)
G06N 20/00    (2019.01)

(52) U.S. Cl.
CPC ......... *G06F 11/3688* (2013.01); *G06F 11/36* (2013.01); *G06F 11/3612* (2013.01); *G06F 11/3672* (2013.01); *G06N 20/00* (2019.01)

(58) Field of Classification Search
None
See application file for complete search history.

(56) References Cited

U.S. PATENT DOCUMENTS

| 4,841,456 A | 6/1989 | Hogan, Jr. et al. |
| 8,418,000 B1 | 4/2013 | Salame |
| 2017/0004064 A1* | 1/2017 | Rufai ................ G06F 11/3612 |
| 2019/0235997 A1* | 8/2019 | Mitchell ........... G06F 11/3696 |

* cited by examiner

Primary Examiner — Wynuel S Aquino
Assistant Examiner — Mark A Gooray
(74) Attorney, Agent, or Firm — Finnegan, Henderson, Farabow, Garrett & Dunner, LLP

(57) ABSTRACT

The present disclosure discloses method and automated exploratory testing system for performing automated exploratory testing of software applications. The automated exploratory testing system receives test application and data associated with test application, from data sources. The data comprises environment information and goal information. The system identifies defects in components of test application along with corresponding reward value, by performing a plurality of actions on each of components. The plurality of actions is determined based on a predefined machine learning technique and data. The system determines test strategy, by analysing components with defects, plurality of actions corresponding to defects, corresponding reward value and historic test data associated with other applications related to test application. Thereafter, the system performs actions identified from plurality of actions based on test strategy, on components, to identify additional defects in components, for performing automated exploratory testing.

10 Claims, 8 Drawing Sheets

METHOD AND SYSTEM OF PERFORMING AUTOMATED EXPLORATORY TESTING OF SOFTWARE APPLICATIONS

TECHNICAL FIELD

The present subject matter is related in general to exploratory testing, more particularly, but not exclusively to a method and system of performing automated exploratory testing of software applications.

BACKGROUND

Software testing is a key component in software development process as it improves consistency and performance of software developed. Though main benefit of testing involves error rectification and debugging, testing also helps businesses understand an actual and expected outcome. The objective of the software testing is to verify and validate the integration of software, hardware, and configuration thereof, and to prevent malfunction of software when in use. Among multiple types of software testing, an exploratory testing is a freestyle or independent testing, which is independent of any set of test cases or scenarios and is based on experience and knowledge of a tester regarding requirements specified by a client. Particularly, the exploratory testing is a manual effort which is usually performed after automated system testing. The exploratory testing is performed to identify any issues which system testing might have ignored by having a manual test engineer trying to identify issues through random explorations.

Currently, conventional testing tools may not automate exploratory testing due to nature of testing being performed. The testing tools currently available do not have variability and lack an ability to replicate exploration behaviour and adapt to the changing nature of the application. One of existing approach for testing each of the components of an application is brute force approach, in order to cover all scenarios. However, brute force approach may be impractical due to time and resource constraint.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method of performing automated exploratory testing of software applications. The method comprises receiving a test application and a data associated with the test application, from one or more data sources. The data comprises environment information and goal information related to the test application. The method comprises identifying defects in one or more components of the test application along with a corresponding reward value, by performing a plurality of actions on each of the one or more components. The plurality of actions is determined based on a predefined machine learning technique and the data. Further, the method comprises determining a test strategy, by analysing the one or more components with the defects, the plurality of actions corresponding to the defects, the corresponding reward value and historic test data associated with one or more other applications related to the test application. Thereafter, the method comprises performing one or more actions identified from the plurality of actions based on the test strategy, on the one or more components, to identify additional defects in the one or more components, for performing automated exploratory testing.

In an embodiment, the present disclosure may relate to an automated exploratory testing system for performing automated exploratory testing of software applications. The automated exploratory testing system may comprise a processor and a memory communicatively coupled to the processor, where the memory stores processor executable instructions, which, on execution, may cause the automated exploratory testing system to receive a test application and a data associated with the test application, from one or more data sources. The data comprises environment information and goal information related to the test application. The automated exploratory testing system identifies defects in one or more components of the test application along with a corresponding reward value, by performing a plurality of actions on each of the one or more components. The plurality of actions is determined based on a predefined machine learning technique and the data. Further, the automated exploratory testing system determines a test strategy, by analysing the one or more components with the defects, the plurality of actions corresponding to the defects, the corresponding reward value and historic test data associated with one or more other applications related to the test application. Thereafter, the automated exploratory testing system performs one or more actions identified from the plurality of actions based on the test strategy, on the one or more components, to identify additional defects in the one or more components, for performing automated exploratory testing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
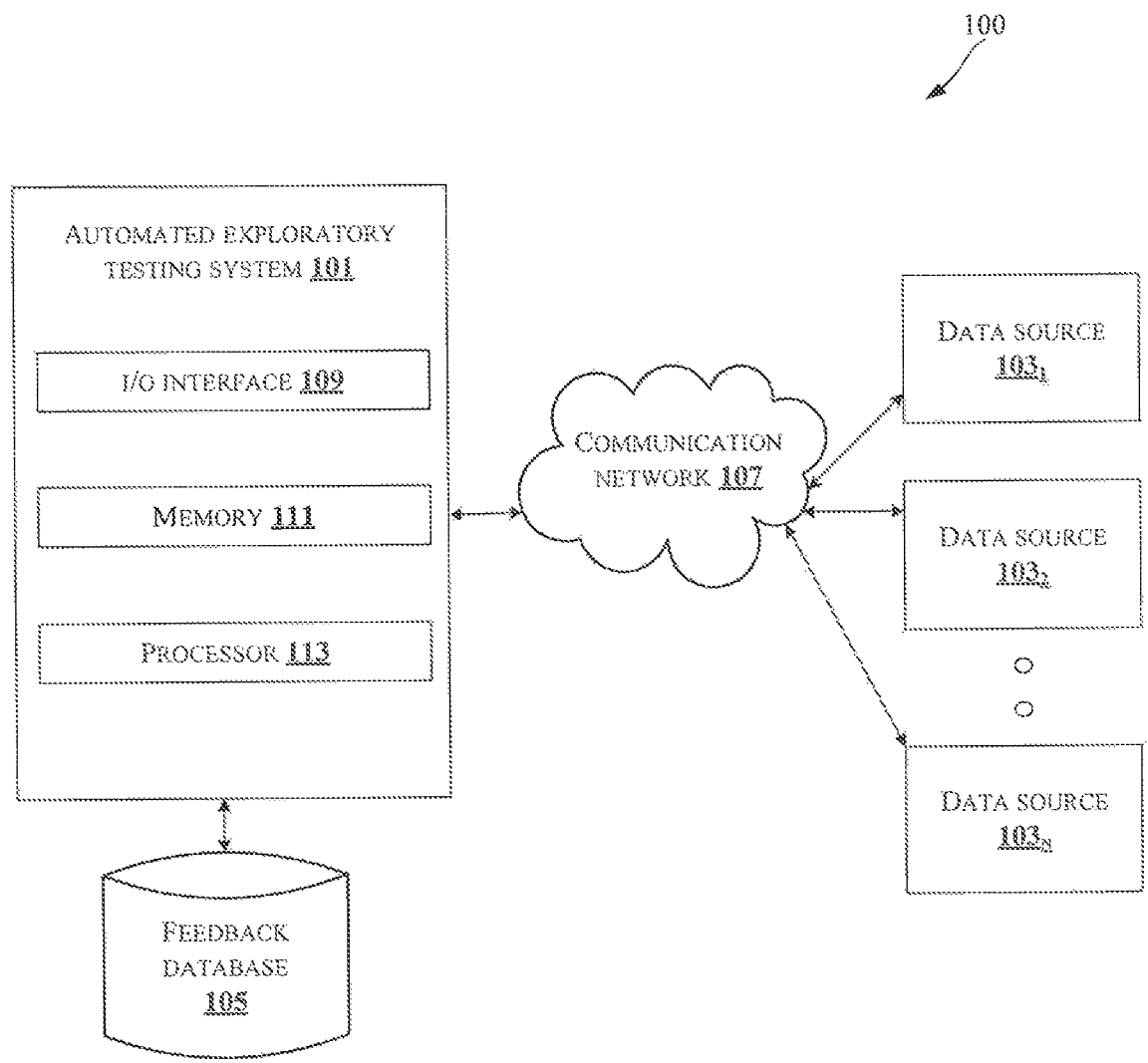
FIG. 1 illustrates an exemplary environment for performing automated exploratory testing of software applications in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and an automated exploratory testing system for performing automated exploratory testing of software applications. In an embodiment, the exploratory testing refers to a software testing technique in which testers explore and identify different means of evaluating and improving quality of software application. The automated exploratory testing system may receive an application along with data associated with the application for testing. Machine learning techniques may be applied on the application along with the data to identify defects in one or more components of the application along with a reward value for each identified defect. The one or more components with defects may be analysed along with the reward value to determine a test strategy based on historic data. Thereafter, the test strategy may be applied on the application to identify any additional defects in the application. The present disclosure reduces human intervention by automating exploratory testing.

FIG. 1 illustrates an exemplary environment for performing automated exploratory testing of software applications in accordance with some embodiments of the present disclosure.

As shown in FIG. 1, an environment 100 includes an automated exploratory testing system 101 connected through a communication network 107 to a data source $103_1$, a data source $103_2$ . . . and a data source $103_N$ (collectively referred as data sources 103). The automated exploratory testing system 101 may also be connected to a feedback database 105. In one embodiment, the data sources 103 may be any computing devices associated with users, for example a laptop, a desktop computer, a Personal Digital Assistant (PDA), a notebook, a smartphone, a tablet, and any other computing devices. A person skilled in the art would understand that the scope of the present disclosure may encompass any other data sources 103, for providing test application and corresponding data, not mentioned herein explicitly. Further, the communication network 107 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like.

The automated exploratory testing system 101 may perform automated exploratory testing of software applications. In an embodiment, the software applications may refer to a program designed to perform a specific function directly for the users or, in some cases, for another application. In one embodiment, the automated exploratory testing system 101 may include, but is not limited to, a laptop, a desktop computer, a Personal Digital Assistant (PDA), a notebook, a smartphone, a tablet, a server, and any other computing devices. A person skilled in the art would understand that, any other devices, not mentioned explicitly, may also be used as the automated exploratory testing system 101 in the present disclosure. The automated exploratory testing system 101 may include an I/O interface 109, a memory 111 and a processor 113. The I/O interface 109 may be configured to receive the test application and a data associated with the test application. Further, the I/O interface 109 may receive historic data from the feedback database 105. The test application and the data received from the I/O interface 109 may be stored in the memory 111. The memory 111 may be communicatively coupled to the processor 113 of automated exploratory testing system 101. The memory 111 may also store processor instructions which may cause the processor 113 to execute the instructions for performing automated exploratory testing of software applications.

In an implementation, the automated exploratory testing system 101 may be configured as a standalone device or may be integrated with computing systems. In an embodiment, the automated exploratory testing system 101 may include a machine learning model. Initially, the automated exploratory testing system 101 may train the machine learning model based on a plurality of predetermined test strategy data associated with other applications related to the test application.

In real-time, the automated exploratory testing system 101 may receive the test application on which the exploratory testing has to be performed and the data associated with the test application from the data sources 103. In an embodiment, the data includes environment information and goal information related to the test application. The environment information may include details regarding one or more initial state of the test application, one or more actions to be performed on the test application, one or more new state of the test application upon performing the one or more actions and a corresponding reward value based on the one or more new state of the test application. The goal information includes one of, testing the test application randomly and testing specific components of the test application. The automated exploratory testing system 101 may identify defects in one or more components of the test application along with a corresponding reward value. The defects may be identified by performing a plurality of actions on each of the one or more components. The plurality of actions is determined from the data, based on the predefined machine learning technique. In an embodiment, the predefined machine learning technique may be deep reinforcement technique. For example, the deep reinforcement technique may include Q-learning. A person skilled in the art would understand that any other machine learning technique, not mentioned explicitly herein, may also be used in the present disclosure. Further, after identifying the defects in the one or more components, the automated exploratory testing system 101 may determine a test strategy by analysing the one or more components with the defects, the plurality of actions corresponding to the defects, the corresponding reward value and the historic test data associated with one or more other applications related to the test application. In one embodiment, the historic test data associated with other applications may be retrieved from the feedback database 105. In another embodiment, the historic test data may be stored within the automated exploratory testing system 101. Thereafter, the automated exploratory testing system 101 may perform one or more actions identified from the plurality of actions based on the test strategy on the one or more components. The one or more actions are performed to identify additional defects in the one or more components. In an embodiment, the automated exploratory testing system 101 may learn by the machine learning technique, based on the test strategy determined in real-time for assisting in performing automated exploratory testing of future test applications.

Figure 2:
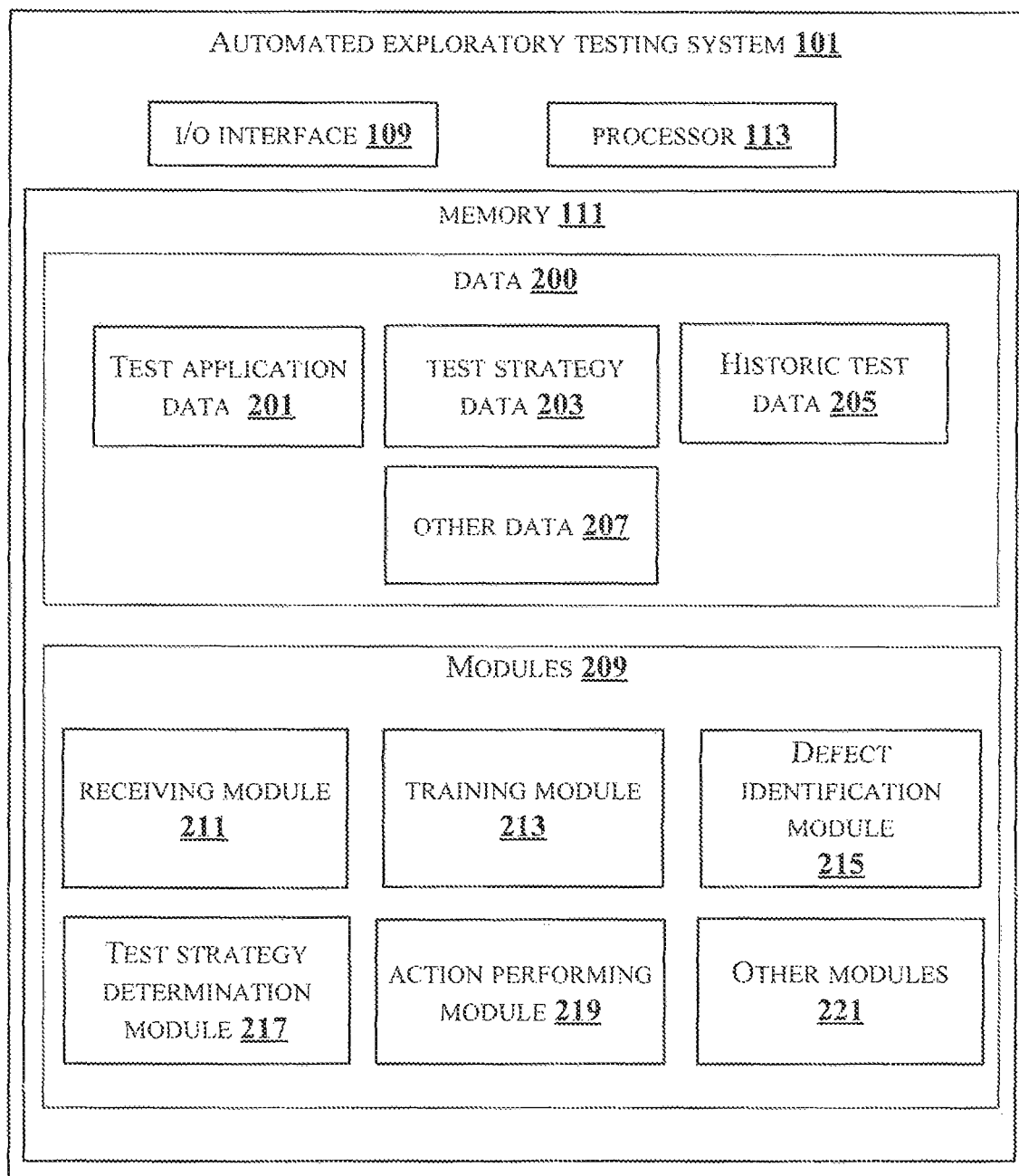
FIG. 2 shows a detailed block diagram of an automated exploratory testing system in accordance with some embodiments of the present disclosure.

FIG. 2 shows a detailed block diagram of an automated exploratory testing system in accordance with some embodiments of the present disclosure.

The automated exploratory testing system 101 may include data 200 and one or more modules 209 which are described herein in detail. In an embodiment, the data 200 may include test application data 201, test strategy data 203, historic test data 205 and other data 207.

The test application data 201 may include the test application received for testing along with the data associated with the test application. The data may include the environment information and the goal information. As an example, the environment information may include details regarding the one or more initial state of the test application, the one or more actions to be performed on the test application, the one or more new state of the test application upon performing the one or more actions and the corresponding reward value based on the one or more new state of the test application. In an embodiment, the reward value may be a positive value in case defects are identified by performing the one or more actions and a negative value if no defects are identified on the test application. In an embodiment, goals for the test application may be set out by a user associated with the test application, such as, a test application developer. The goals may vary based on a stage at which the test application is currently present. In an embodiment, the goal information may include information on whether the testing on the test application is to be performed randomly or on any specific components of the test application.

The test strategy data 203 may include the test strategy determined by analysing defects in one or more components of the test application.

The historic test data 205 may include the test data associated with one or more other applications related to the test application. The test data may be determined by testing the one or more other applications previously by the testers.

The other data 207 may store data, including temporary data and temporary files, generated by modules 209 for performing the various functions of the automated exploratory testing system 101.

In an embodiment, the data 200 in the memory 111 are processed by the one or more modules 209 present within the memory 111 of the automated exploratory testing system 101. In an embodiment, the one or more modules 209 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 209 may be communicatively coupled to the processor 113 for performing one or more functions of the automated exploratory testing system 101. The said modules 209 when configured with the functionality defined in the present disclosure will result in a novel hardware.

In one implementation, the one or more modules 209 may include, but are not limited to a receiving module 211, a training module 213, a defect identification module 215, a test strategy determination module 217 and an action performing module 219. The one or more modules 209 may also include other modules 221 to perform various miscellaneous functionalities of the automated exploratory testing system 101. In an embodiment, the other modules 221 may include a learning module for learning by the machine learning technique based on the test strategy determined in real-time to assist in performing automated exploratory testing of future test applications.

The receiving module 211 may receive the test application and the data associated with the test application from the data sources 103. In an embodiment, the test application and the data may be provided by the user associated with the test application through the data sources 103. For example, the data sources 103 may be any computing devices such as, laptop, mobile phone etc.

The training module 213 may train the machine learning model using the plurality of predetermined test strategy data 203 associated with other applications related to the test application. In an embodiment, the machine learning model may be based on the deep reinforcement technique. As an example, the deep reinforcement technique may include Q-learning technique. In an embodiment, during the training phase, the model may perform actions randomly in any components of the test application to identify the defects.

The defect identification module 215 may identify defects in the one or more components of the test application by performing the plurality of actions on each of the one or more components. The plurality of actions is determined based on the predefined machine learning technique and the data associated with the test application. In an embodiment, the defect identification module 215 may probe the one or more components of the test application. Further, along the defects, the defect identification module 215 may identify a reward value corresponding to each action performed on the one or more components. In one embodiment, upon performing the plurality of actions, if behaviour of the test application remains as expected, a minimal positive reward value may be identified on satisfying two conditions. The first condition indicating the plurality of actions performed on the test application to be valid application action, such as, clicking a button and the like. The second condition indicating the plurality of actions to be performed on main features of the test application. In an embodiment, the minimal positive reward may indicate that the plurality of actions is valid and further probing of the test application may be required. In another embodiment, upon identification of any error, and if the test application may not behave as expected, a maximum reward value may be identified indicating further probing of the specific component where the error occurred. In another embodiment, upon performing the plurality of actions on a specific component of the test application, if no errors are identified on the test application, a negative reward value may be identified. The negative reward value may indicate testing the test application again or testing any other component of the test application. In an embodiment, the negative reward value may also be identified if an invalid action is performed through which no error or a valid application action is identified.

The test strategy determination module 217 may determine the test strategy by analysing the one or more components with the defects, the plurality of actions corresponding to the defects, the corresponding reward value and historic test data 205 associated with one or more other applications related to the test application. The test strategy determination module 217 may receive the reward values, the plurality of actions which corresponded to the defects in the one or more components from the defect identification module 215. Based on the received information along with historic test data 205 associated with one or more other applications, the test strategy determination module 217 may determine one or more actions from the plurality of actions which may be utilized for further testing of the test application. The test strategy determination module 217 may map the plurality of actions performed on the one or more components along with the reward value to the historic test data 205. The test strategy determination module 217 may provide the test strategy as a feedback for storing in the feedback database 105.

The action performing module 219 may perform the one or more actions identified from the plurality of actions based on the test strategy, on the one or more components of the test application. By performing the one or more actions identified based on the test strategy, the action performing module 219 may identify additional defects in the one or more components of the test application.

FIG. 3*a*, FIG. 3*b*, FIG. 3*c*, FIG. 3*d* and FIG. 3*e* show exemplary representations for performing exploratory testing on an application in accordance with some embodiments of the present disclosure.

Figure 3A:
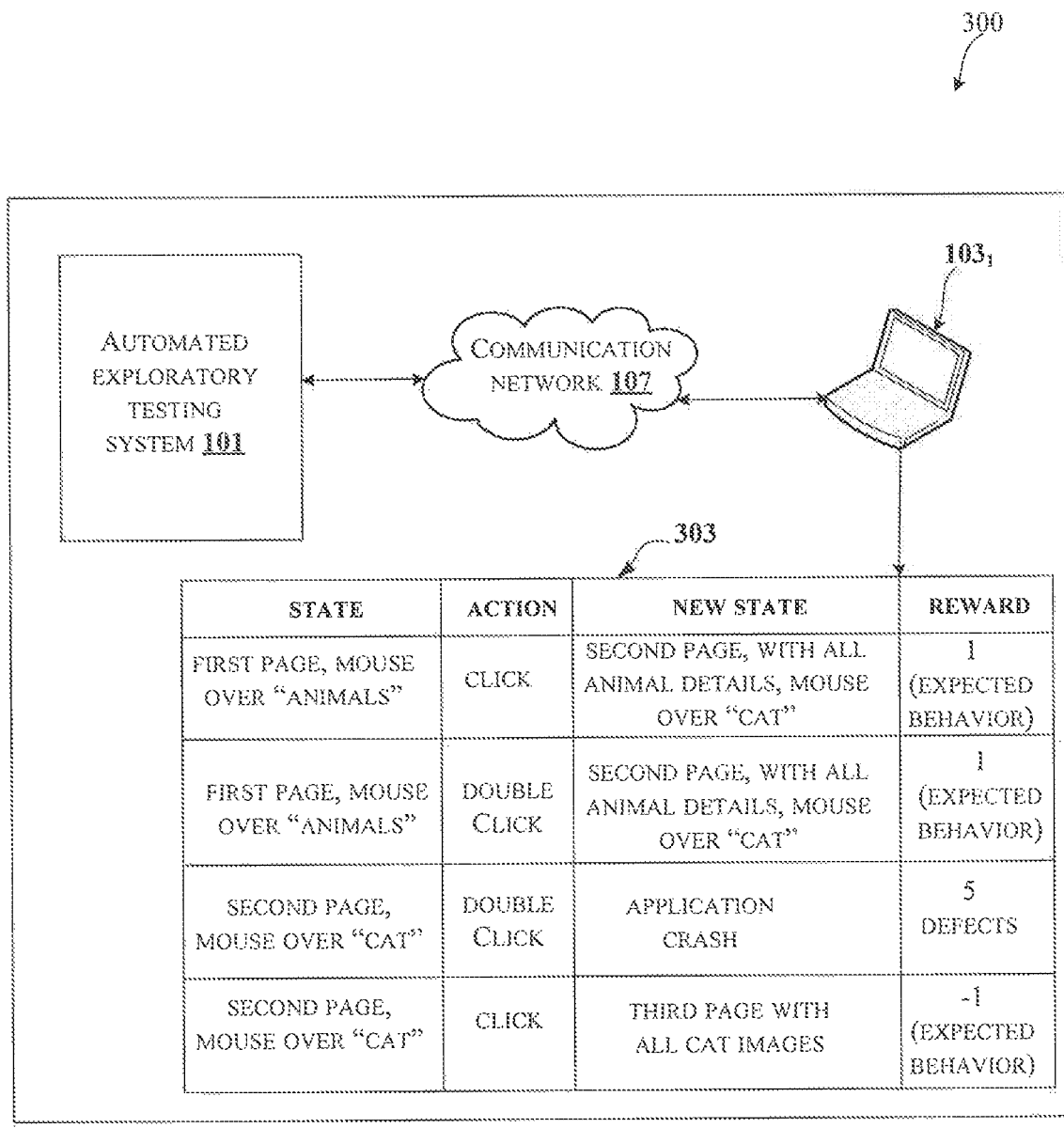
FIG. 3a, FIG. 3b, FIG. 3c, FIG. 3d and FIG. 3e show exemplary representations for performing exploratory testing on an application in accordance with some embodiments of the present disclosure.
Figure 3B:
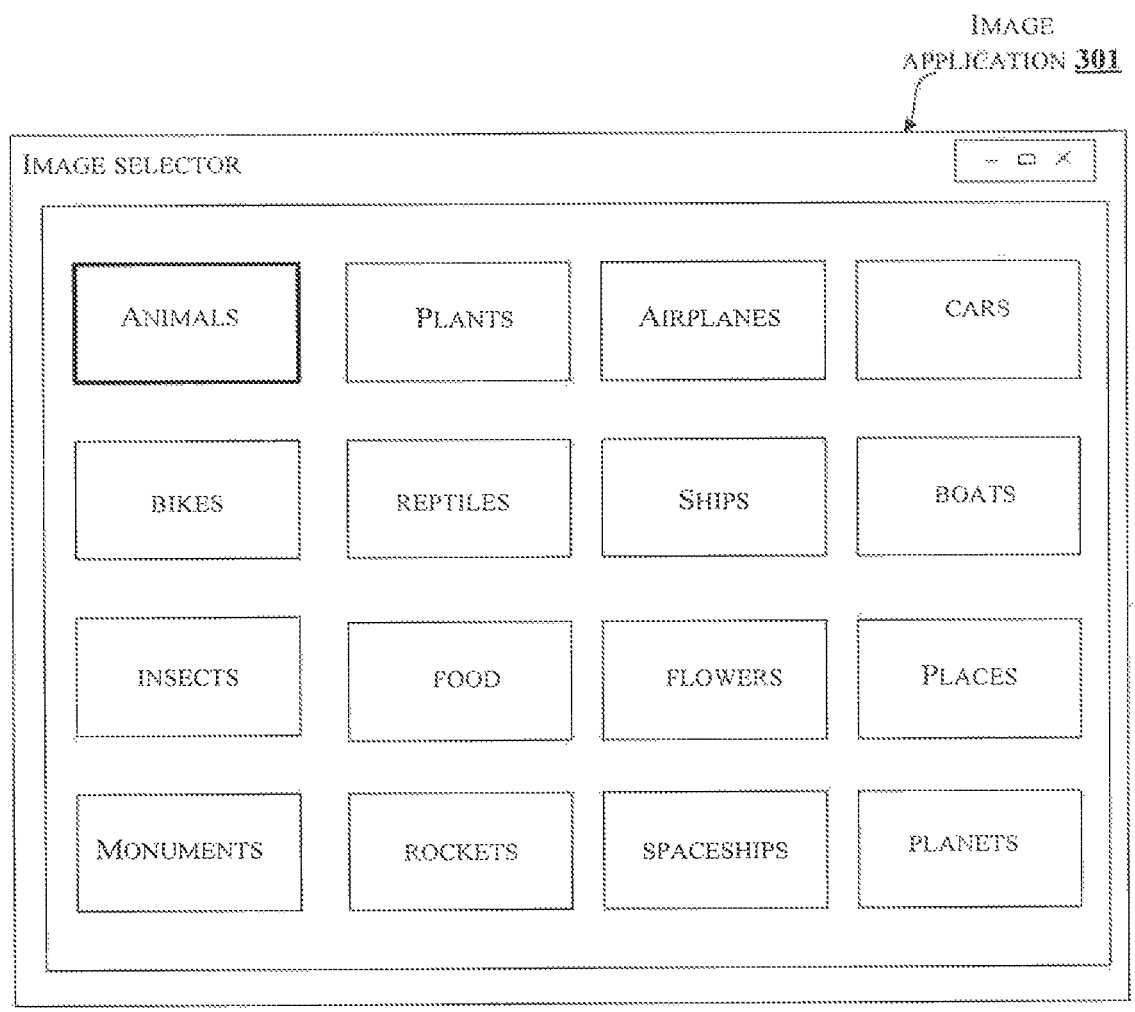

Referring now to FIG. 3*a*, an exemplary representation 300 for performing exploratory testing on a test application is illustrated. FIG. 3*b* illustrates the test application, which is an image application 301. In the FIG. 3*a*, the exemplary representation 300 includes the automated exploratory testing system 101 connected through the communication network 107 to a data source, such as a laptop 103$_1$ associated with the user. In an embodiment, the automated exploratory testing system 101 may be connected to the feedback database 105 (not shown explicitly in FIG. 3*a*). The automated exploratory testing system 101 may receive the image application 301 from the data source 103. To perform exploratory testing on the image application 301, the automated exploratory testing system 101 may train the machine learning model previously using the predetermined test strategy data associated with other applications related to the image application 301.

Figure 3C:
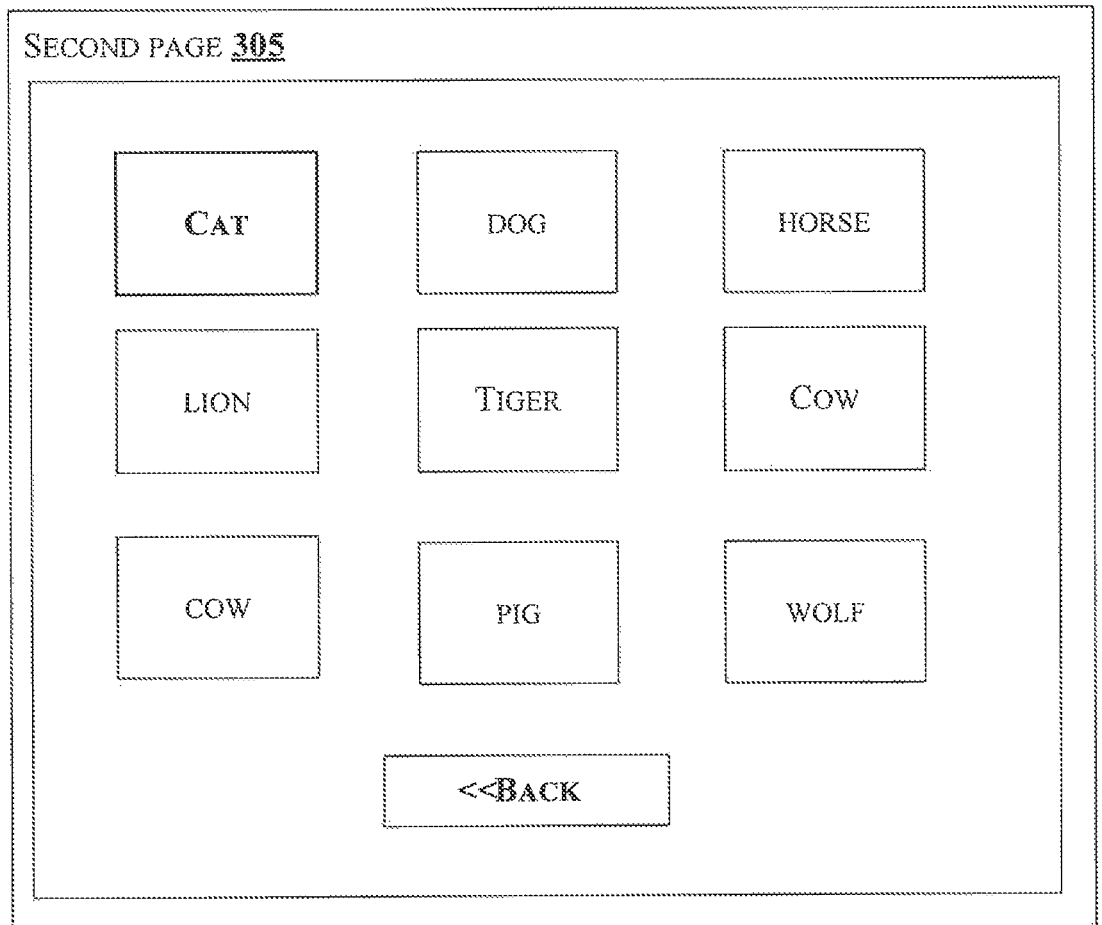
Figure 3D:
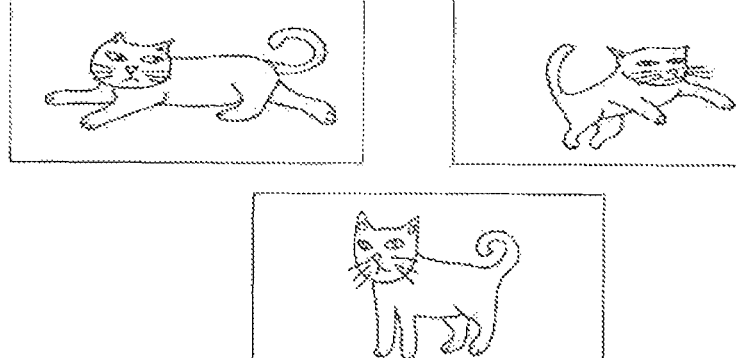
Figure 3E:

In real-time, the automated exploratory testing system 101 may receive the test application along with the data associated with the test application from the data sources 103. In the present case, the automated exploratory testing system 101 may receive the image application 301 from the user through the laptop 103$_1$ and a data associated with the image application 301 as illustrated in FIG. 3*a*. The data may include environment information 303 as shown in FIG. 3*a* and the goal information associated with the image application 301. As shown in FIG. 3*b*, the image application 301 may include different categories for images such as "Animals", "Planets", "Airplanes" and so on. The automated exploratory testing system 101 may identify defects in one or more components of the image application 301 by performing the plurality of actions on each of the one or more components of the image application 301. In this scenario, the one or more components may be one or more categories in the image application 301. In an embodiment, the plurality of actions is determined based on the predefined machine learning technique and the data. In the present case, the plurality of actions may be determined from the environment information 303. For example, the plurality of actions may be clicking on a category, double clicking and the like. The automated exploratory testing system 101 may perform the plurality of actions on the "Animal" category of the image application 301. For instance, in the present case, on clicking the "animal" category of the image application 301, the image application moves to a second page 305 as shown in FIG. 3*c*. The second page 305 discloses various categories of the animals such as, cat, dog, horse and the like. The automated exploratory testing system 101 may perform the plurality of actions on the categories displayed on the second page 305. Particularly, on clicking, i.e. single click, the "cat" category in the second page 305, the second page 305 may move and display a third page 307. Further, on performing a single click on the "cat" category may generate a reward value of "−1". The reward value is a negative value, i.e. "−1", since on performing the "single click" action, the category "cat", displays the cat image which is within the expected behaviour of the image application 301. The third page 307 displays different images of the cat as shown in FIG. 3*d*. However, on performing the "double click" action on the "cat" category, an error may be displayed, indicating defects in the test application. Thus, the automated exploratory testing system 101 may identify a defect while double clicking the "cat" category resulting in the application error as shown in FIG. 3*e*. Particularly, on double clicking, the "cat" category in the second page 305, the second page 305 moves and displays a forth page 309. The fourth page 309 displays the application error. Along with the defect, the corresponding reward value is identified as "five". In an embodiment, the reward value may be positive value in case defects are identified and a negative value if no defects are identified on the test application. In one embodiment, upon performing an action, if behaviour of the test application remains as expected, a minimal positive reward value may be generated indicating that the action is valid. In another embodiment, upon identification of any error and if the test application may not behave as expected, a maximum reward may be generated indicating further probing of specific component where the error occurred. In the present case, the reward value is maximum value, i.e. "five", since on performing the "double click" action, the category "cat", displays error which is not the expected behaviour of the image application 301. In this case, the maximum reward value may indicate that the category "cat" may include further potential of additional defect and performing double clicking action on the animal category may result in defects. Further, the automated exploratory testing system 101 may press back button and reach back to the "animal" category on the image application 301. Further, the automated exploratory testing system 101 may determine the test strategy, by analysing the one or more components with the defects, the plurality of actions corresponding to the defects, the corresponding reward value and historic test data associated with one or more other applications related to the test application. In the present case, the automated exploratory testing system 101 may analyse the "cat" category with the defect along with double click action, the reward value and the historic data associated with one or more other applications related to the image application 301. Thereafter, the automated exploratory testing system 101 may perform one or more actions identified from the plurality of actions based on the test strategy, on the one or more components, to identify additional defects in the one or more components. Further, once the testing for the "cat" category is completed, the automated exploratory testing system 101 may repeat the process of performing the plurality of actions on the other categories of the image application 301 as well. Particularly, the automated exploratory testing system 101 may perform double click action on each animal category on the second page to identify any other additional defects in the animal category. Further, the automated exploratory testing system 101 may probe the category "cat" with other actions such as, right click operation and the like to identify additional defects.

Figure 4:
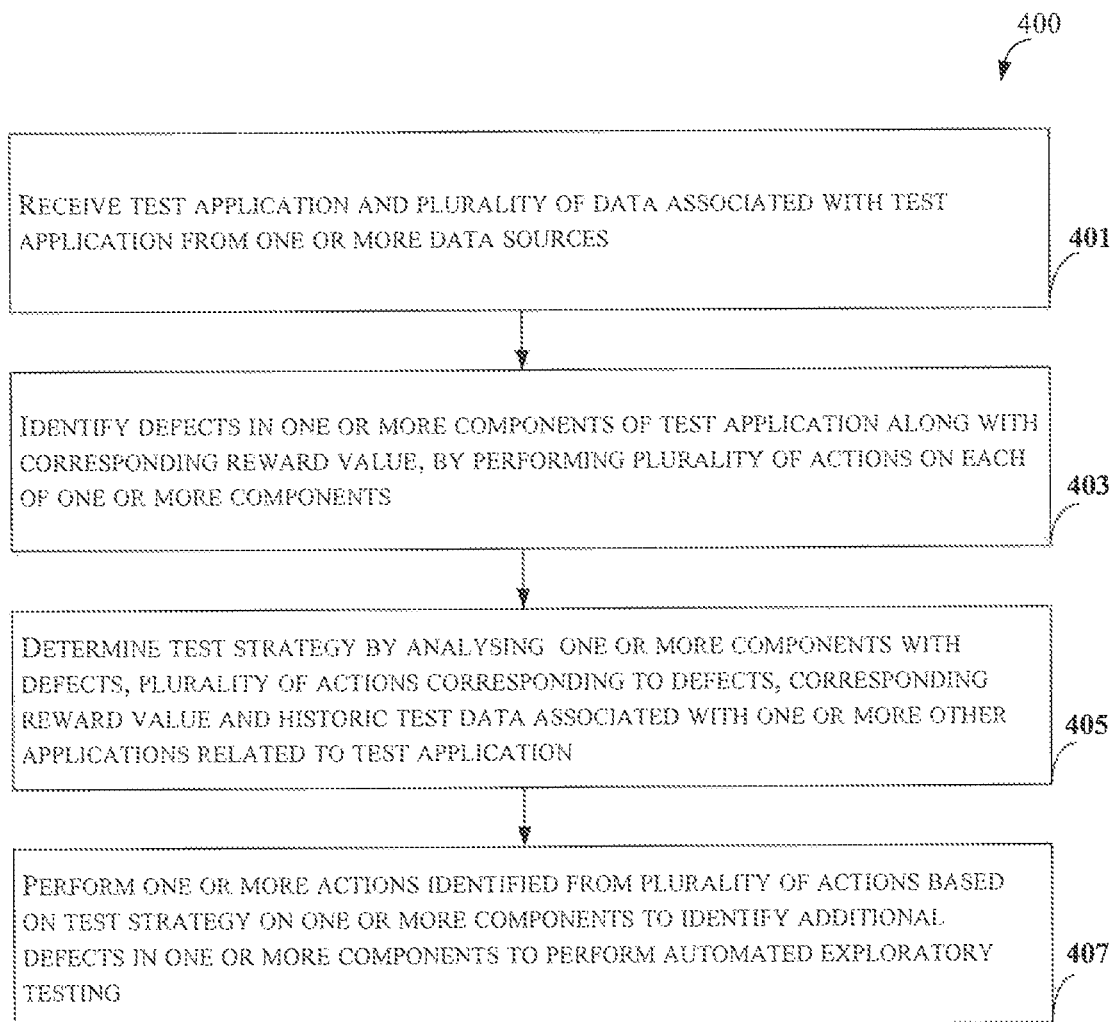
FIG. 4 illustrates a flowchart showing a method for performing automated exploratory testing of software applications in accordance with some embodiments of present disclosure.

FIG. 4 illustrates a flowchart showing a method for performing automated exploratory testing of software applications in accordance with some embodiments of present disclosure.

As illustrated in FIG. 4, the method 400 includes one or more blocks for performing automated exploratory testing of software applications. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the test application and the data associated with the test application is received by the receiving module 211, from the data sources 103. The data may include environment information and goal information related to the test application.

At block 403, the defects may be identified, by the defect identification module 215, in the one or more components of the test application along with the corresponding reward value. The defects may be identified by performing the plurality of actions on each of the one or more components.

The plurality of actions is determined based on the predefined machine learning technique and the data.

At block 405, the test strategy is determined by the test strategy determination module 217 by analysing the one or more components with the defects, the plurality of actions corresponding to the defects, the corresponding reward value and historic test data 205 associated with one or more other applications related to the test application.

At block 407, one or more actions identified from the plurality of actions based on the test strategy, are performed by the action performing module 219, on the one or more components, to identify additional defects in the one or more components, for performing automated exploratory testing.

Computing System

Figure 5:
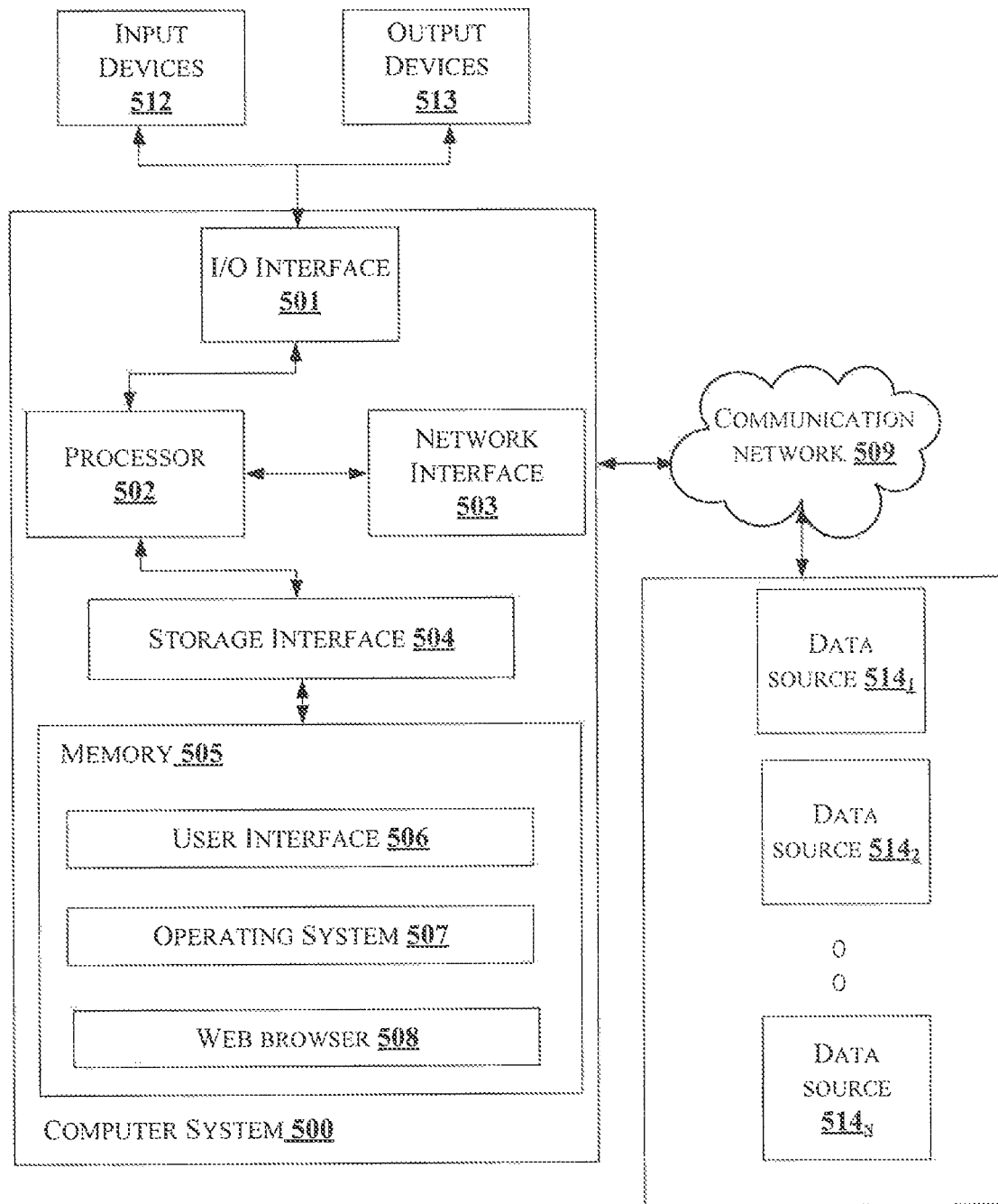
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the automated exploratory testing system 101. The computer system 500 may include a central processing unit ("CPU" or "processor") 502. The processor 502 may include at least one data processor for performing automated exploratory testing of software applications. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of the automated exploratory testing system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a data source 514$_1$, a data source 514$_2$ ... and a data source 514$_N$ (referred as data sources 514). The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT®, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure performs automated exploratory testing on software applications.

An embodiment of the present disclosure reduces human intervention in coming up with innovative ways to find out new issues in exploratory testing which is not covered as part of standard test cases.

An embodiment of the present disclosure helps to rapidly automate a cognitive manual task in testing.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Automated exploratory testing system |
| 103 | Data sources |
| 105 | Feedback database |
| 107 | Communication network |
| 109 | I/O interface |
| 111 | Memory |
| 113 | Processor |
| 200 | Data |
| 201 | Test application data |
| 203 | Test strategy data |
| 205 | Historic test data |
| 207 | Other data |
| 209 | Modules |
| 211 | Receiving module |
| 213 | Training module |
| 215 | Defect identification module |
| 217 | Test strategy determination module |
| 219 | Action performing module |
| 221 | Other modules |
| 301 | Image application |
| 303 | Environment information |
| 305 | Second page |
| 307 | Third page |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Data sources |

I claim:

1. A method of performing automated exploratory testing of software applications, the method comprising:

receiving, by an automated exploratory testing system, a test application and data associated with the test application, from one or more data sources, wherein the data comprises environment information and goal information related to the test application and wherein the environment information comprises a plurality of actions and the goal information comprises one or more components;

identifying, by the automated exploratory testing system, defects in the one or more components of the test application along with a corresponding reward value, by performing a determined plurality of actions on each of the one or more components, wherein the plurality of actions are determined in real-time based on a predefined machine learning technique, the goal information and the environment information, wherein during a training phase, the predefined machine learning technique performs actions randomly on any components of the test application to identify the defects, wherein the reward value corresponding to each action performed on the one or more components is identified based on a first condition and a second condition, wherein the first condition indicates the plurality of actions that are performed on the test application and are valid application actions, wherein the second condition indicates that the plurality of actions are performed on main features of the test application, wherein if behavior of the test application remains as expected then a minimal positive reward value is identified, wherein if behavior of the test application is not as expected then a maximum reward value is identified indicating that further probing of a specific component is required where an error has occurred, and wherein upon performing the plurality of actions on the specific component of the test application, if no errors are identified on the test application, a negative reward value is identified;

determining, by the automated exploratory testing system, a test strategy that comprises one or more actions from the plurality of actions, by analyzing the one or more components with the defects, the plurality of actions corresponding to the defects, the corresponding reward value and historic test data associated with one or more other applications related to the test application; and performing, by the automated exploratory testing system, the one or more actions included in the test strategy and determined from the plurality of actions on the one or more components, to identify additional defects in the one or more components, for performing automated exploratory testing.

2. The method as claimed in claim 1, wherein the environment information comprises details regarding one or more initial state of the test application, one or more actions to be performed on the test application, one or more new state of the test application upon performing the one or more actions and a corresponding reward value based on the one or more new state of the test application.

3. The method as claimed in claim 1, wherein the goal information comprises one of, testing the test application randomly and testing specific components of the test application.

4. The method as claimed in claim 1, wherein the automated exploratory testing system is trained, with a plurality of predetermined test strategy data associated with other applications related to the test application using the predefined machine learning technique.

5. The method as claimed in claim 1 further comprising learning, by the machine learning technique, based on the determined one or more actions from the plurality of actions in real-time to assist in performing automated exploratory testing of future test applications.

6. An automated exploratory testing system for performing automated exploratory testing of software applications, comprising:
 a processor; and
 a memory communicatively coupled to the processor, wherein the memory stores processor instructions, which, on execution, causes the processor to:
 receive a test application and a data associated with the test application, from one or more data sources, wherein the data comprises environment information and goal information related to the test application and wherein the environment information comprises a plurality of actions and the goal information comprises one or more components;
 identify defects in the one or more components of the test application along with a corresponding reward value, by performing a determined plurality of actions on each of the one or more components, wherein the plurality of actions are determined in real-time based on a predefined machine learning technique, the goal information and the environment information, wherein during a training phase, the predefined machine learning technique performs actions randomly on any components of the test application to identify the defects,
 wherein the reward value corresponding to each action performed on the one or more components is identified based on a first condition and a second condition, wherein the first condition indicates the plurality of actions that are performed on the test application and are valid application actions, wherein the second condition indicates that the plurality of actions are performed on main features of the test application, wherein if behavior of the test application remains as expected then a minimal positive reward value is identified, wherein if behavior of the test application is not as expected then a maximum reward value is identified indicating that further probing of a specific component is required where an error has occurred, and wherein upon performing the plurality of actions on the specific component of the test application, if no errors are identified on the test application, a negative reward value is identified;
 determine a test strategy that comprises one or more actions from the plurality of actions by analyzing the one or more components with the defects, the plurality of actions corresponding to the defects, the corresponding reward value and historic test data associated with one or more other applications related to the test application; and
 perform the one or more actions included in the test strategy and determined from the plurality of actions on the one or more components, to identify additional defects in the one or more components, for performing automated exploratory testing.

7. The automated exploratory testing system as claimed in claim 6, wherein the environment information comprises details regarding one or more initial state of the test application, one or more actions to be performed on the test application, one or more new state of the test application upon performing the one or more actions and a corresponding reward value based on the one or more new state of the test application.

8. The automated exploratory testing system as claimed in claim 6, wherein the goal information comprises one of, testing the test application randomly and testing specific components of the test application.

9. The automated exploratory testing system as claimed in claim 6, wherein the processor trains the automated exploratory testing system with a plurality of predetermined test strategy data associated with other applications related to the test application, using the predefined machine learning technique.

10. The automated exploratory testing system as claimed in claim 6 further comprising learning, by the machine learning technique, based on the determined one or more actions from the plurality of actions in real-time to assist in performing automated exploratory testing of future test applications.

\* \* \* \* \*